United States Patent

[11] 3,569,852

[72] Inventor Barouh V. Berkovits
Newton Highlands, Mass.

[21] Appl. No. 793,261
[22] Filed Jan. 23, 1969
[45] Patented Mar. 9, 1971
[73] Assignee American Optical Corporation
Southbridge, Mass.

[54] FREQUENCY SELECTIVE VARIABLE GAIN AMPLIFIER
18 Claims, 14 Drawing Figs.

[52] U.S. Cl. .......... 330/132, 128/2.06, 330/29, 330/134, 330/145, 330/149
[51] Int. Cl. .......... H03f 1/26
[50] Field of Search .......... 330/145, 29, 132, 134, 141, 149, 51; 328/165, 167; 307/233; 128/2.06

[56] References Cited

UNITED STATES PATENTS

| | | | |
|---|---|---|---|
| 2,112,595 | 3/1938 | Farnham | 330/145X |
| 3,370,243 | 2/1968 | Vollmer | 330/145X |
| 3,407,360 | 10/1968 | Buhr | 330/51X |
| 3,453,486 | 7/1969 | Weber | 128/2.6X |

FOREIGN PATENTS

| | | | |
|---|---|---|---|
| 951,058 | 3/1964 | Great Britain | 330/134 |

*Primary Examiner*—Roy Lake
*Assistant Examiner*—James B. Mullins
*Attorneys*—William C. Nealon, Noble S. Williams and Robert J. Bird

ABSTRACT: An amplifier for an electrocardiographic monitoring system. The band-pass of the amplifier is such that ordinarily all frequency components of the ECG signal are amplified to the same extent. In the presence of a low frequency noise signal which causes the output voltage to exceed a maximum limit in either direction, the low frequency 3-db. point is raised from .05 Hertz to 1.0 Hertz. This is achieved simply by lowering the time constant of a high pass filter in the amplifier. The shorter time constant reduces the effect of low frequency noise on the output voltage. While some of the low frequency components in the ECG signal are attenuated, most of the usable information in the signal is retained. The shorter time constant also provides a faster recovery for the amplifier following large direct current voltage changes. This is especially beneficial when the patient electrodes of the monitoring system are switched and they induce a charge in the DC component of the ECG signal which might saturate the ECG preamplifier. Similarly, in the presence of high frequency noise signals the high frequency 3-db. point is lowered for a similar purpose.

Patented March 9, 1971 3,569,852

4 Sheets-Sheet 1

INVENTOR.
BAROUH V. BERKOVITS

BY William C. Weaker
ATTORNEY

INVENTOR.
BAROUH V. BERKOVITS
BY William C. Mealer
ATTORNEY

INVENTOR.
BAROUH V. BERKOVITS
BY William C. Nealon
ATTORNEY

INVENTOR.
BAROUH V. BERKOVITS

BY William C. Welch
ATTORNEY

FREQUENCY SELECTIVE VARIABLE GAIN AMPLIFIER

This invention relates to amplifiers, and more particularly to improved operation of amplitude-sensitive amplifiers such as those used in electrocardiographic monitoring equipment.

ECG are a number of different types of electrocardiographic monitoring equipments. Typically, electrodes are appropriately placed on the patient, the ECG. signals detected are amplified in a multistage amplifier, and the amplified signals operate the monitoring equipment accordingly. A typical equipment, and the one with respect to which the present invention is described, is one which provides a trace of the ECG signal on a continuously advancing strip of paper.

Ideally, the trace consists of a series of ECG signals superimposed on a base line along the center of the paper strip. The total signal monitored is the sum of the ECG signal itself and any noise which may be present. The total signal is typically the ECG signal superimposed on a continuously changing DC voltage.

Often, the presence of noise (including changes in the DC component of the signal) does not seriously impair the usefulness of the trace. The cardiologist is still in a position to examine each individual ECG waveform. However, in many cases the noise is so great that the pen or other writing mechanism is deflected past the limits of the paper. Alternatively, the writing mechanism may be constrained within upper and lower limits on the paper, but in such a case the trace simply degenerates into straight line segments at the two outer limits. In either case, no useful information is recorded.

Similarly, although less common, large magnitude, high frequency noise can also result in an almost total loss of useful information.

It is a general object of my invention to provide an amplifier circuit, particularly suited for use with electrocardiographic monitoring equipment, whose characteristics are automatically adjusted in accordance with the input signal such that in the presence of large magnitude noise the output waveform is held within tolerable limits.

This is achieved, in the presence of large magnitude noise, at the expense of an imperfect reproduction of the input signal, but even an imperfect output signal is better than none at all. This is especially true in electrocardiographic systems. In practice, I have found that even in the presence of noise the output signal is sufficiently true so as to enable the cardiologist to extract much of the information which would otherwise be obtained from an exact reproduction of the ECG signal. This is especially true in the more common case of low frequency noise.

Briefly, in accordance with the principles of my invention, in the electrocardiographic embodiment thereof, the ECG signal is applied to the input of an amplifier circuit having a predesigned time constant. The time constant results from applying the ECG signal to the amplifier input through a capacitor. The capacitor, and the input impedance of the amplifier, have values such that the gain characteristic of the amplifier is constant for all frequency components of interest in the ECG signal.

The output signal is compared to predetermined upper and lower values corresponding to two lines on the paper strip near the edges. If the output signal exceeds either of these limits (in either direction) as a result of low frequency interfering noise, an additional resistor of low value is placed in parallel with the input impedance of the amplifier. This additional resistor results in the shortening of the input time constant of the amplifier. The shortening of the time constant has a great effect on low frequency signals such as noise. Thus, the noise component of the total signal is greatly attenuated with respect to the ECG component of the total signal and the output trace is maintained within the limits of the paper strip.

The shortened input time constant does affect each ECG waveform. The frequency analysis of a typical ECG waveform reveals that it comprises many frequency components. The low frequency components are attenuated by the shortened input time constant in the same manner that the low frequency noise is attenuated. However, the shortened time constant has little effect on the high frequency components of the ECG signal. Fortunately, the ECG signal is characterized primarily by narrow frequency band components. This is especially true of the QRS complex of each ECG waveform which is of primary concern. Thus, while the resulting trace between each threshold line and the corresponding edge of the paper is degraded slightly, it nevertheless provides most of the useful information required by the cardiologist. Between the two threshold lines (corresponding to the two signal levels which cause the input time constant to be shortened, the ECG signal is faithfully recorded inasmuch as whenever the output signal is between the two threshold levels the long input time constant is switched back into the circuit.

Similarly, if the high frequency components in the total output signal exceed a predetermined threshold a capacitor is inserted in parallel with an amplifier input. The capacitor attenuates the high frequency components in the total signal. While the distortion of the ECG waveforms is greater than that in the low frequency noise case, any trace is still better than none at all.

It is a feature of my invention to provide in an amplifier a circuit for determining when the output signal exceeds a predetermined threshold level in either direction as a result of noise, and in response thereto to change the gain characteristics of the amplifier in accordance with the frequency content of the noise until the output signal returns to within the desirable bounds.

Further objects, features and advantages of my invention will become apparent upon consideration of the following detailed description in conjunction with the drawing, in which.

Figure 1A:
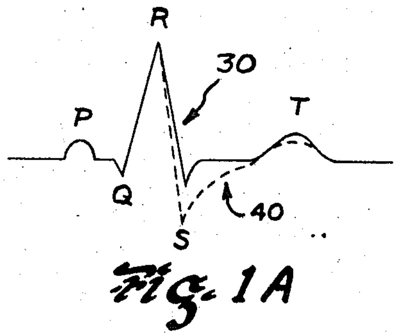
FIG. 1A depicts a typical ECG signal 30, together with the shape of the signal 40 after it is passed through a filter having a short time constant.

Referring to FIG. 1A, solid line 30 depicts a typical ECG waveform signal, with the P,Q,R,S and T peaks being identified in accordance with common medical practice. Assuming that a series of identical signals of the type shown arrive periodically, it is possible to derive the frequency spectrum of the signal. It includes both high and low frequencies, the QRS complex contributing most to the high frequencies, and the P and T waves contributing most of the low frequencies. If the signal is passed through a high-pass filter, which has the effect of attenuating low frequencies, the original signal is changed as shown by dotted line 40. The individual parts of the signal are still recognizable. To a cardiologist, the changed signal still provides a considerable amount of useful information.

Figure 1B:
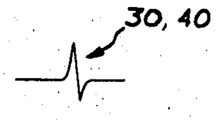
FIG. 1B depicts the symbol used throughout the remaining FIGS. to show either of the signals of FIG. 1A, the symbol of FIG. 1B being used in the other FIGS. with either of the numerals 30, 40 to identify the particular one of the two signals of FIGS. 1A which it is intended to illustrate.

FIG. 1B is simply a "short-hand" symbol for representing either of signals 30 and 40 of FIG. 1A. It is the symbol of FIG.. 1B which is used throughout the remainder of the drawings with the numeral 30 or 40 being used to identify the particular one of the signals of FIG. 1A which is depicted in each case by the common symbol of FIG. 1B.

Figure 2:
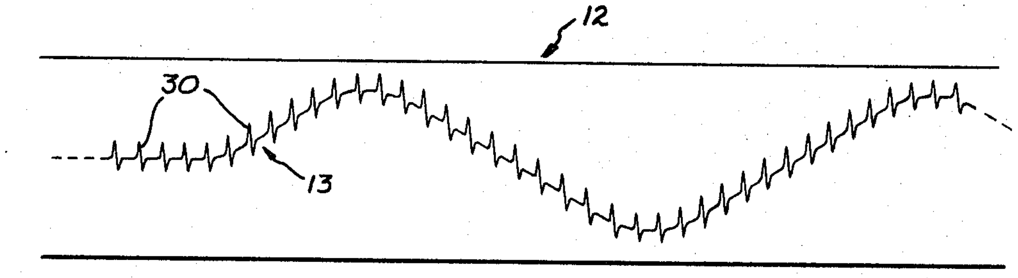
FIG. 2 illustrates a typical electrocardiogram produced in the presence of low level, low frequency noise.

FIG. 2 depicts a typical electrocardiogram derived in the presence of low level, low frequency noise. Baseline 13 on paper strip 12 follows the noise. Superimposed on the noise are the ECG signals. Each of these signals 30 is a faithful reproduction of the actual signal from the patient. The fact that the base line fluctuates is of no moment—all of the pertinent information is contained within each PQRST complex. (It should be noted that the trace of FIG. 2 does not show any of the details of a PQRST complex. As discussed above, each of the "pips" 30 on FIG. 2 actually represents the detailed waveform 30 of FIG. 1A. The detailed waveforms are not shown in FIG. 2, or in any of the ECG FIGS. primarily because it is desired to illustrate the relative frequencies of the ECG signals and the noise signal. This can only be accomplished by showing the ECG waveforms close together, in which case the details of each waveform cannot be included in the drawings).

Figure 3:
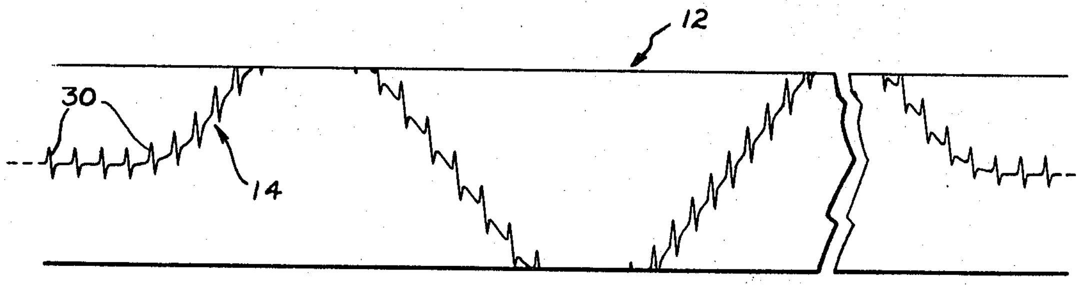
FIGS. 3 and 4 depict similar traces, depending on the type of monitoring equipment used, in the presence of high level, low frequency noise.

FIG. 3 is similar to FIG. 2 but illustrates the trace produced in a typical prior art electrocardiogram apparatus in the presence of high level, low frequency noise. It is assumed that initially there was no noise and the ECG waveforms, at the left of the drawing, are superimposed on a baseline at the center of paper strip 12. As soon as the noise interferes with the ECG signal, the pips follow the low frequency noise, i.e., the pips are superimposed on baseline 14. If the noise level is high enough, the pen which traces out the drawing can be deflected past either edge of the paper strip. During those time periods that the pen is off the paper, nothing is recorded.

Figure 4:
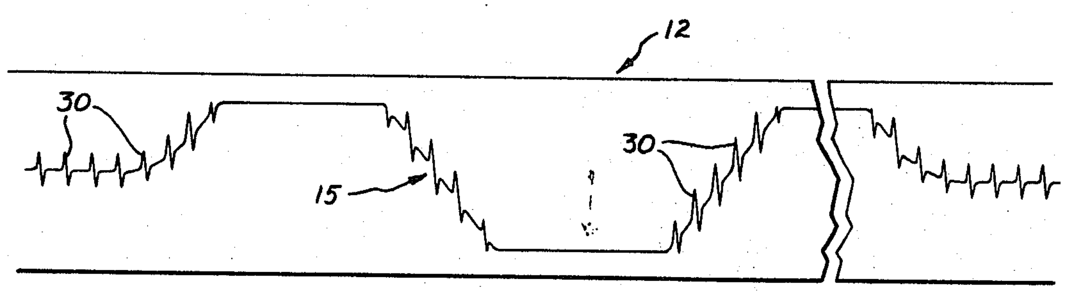

In some prior art systems the travel path of the pen is limited to a range within the outer limits of the paper. Referring to FIG. 4, pips 30 are superimposed on baseline 15 in a manner very similar to that FIG. 3. But here, since the pen cannot move past the limits represented by the straight-line segments of baseline 15, while a trace is still obtained it is of no value in the straight-line regions. It should be noted that the negative pips are not recorded on the upper part of the trace nor are the positive pips recorded on the lower part of the trace. With respect to the upper part of the trace, the total voltage, even during the occurrence of each negative pip, is still greater than the maximum voltage of one polarity which can be recorded. Similarly, positive pips at the bottom of the trace still result in a total voltage which exceeds the maximum voltage of the other polarity which can be recorded.

Figures 5, 6:
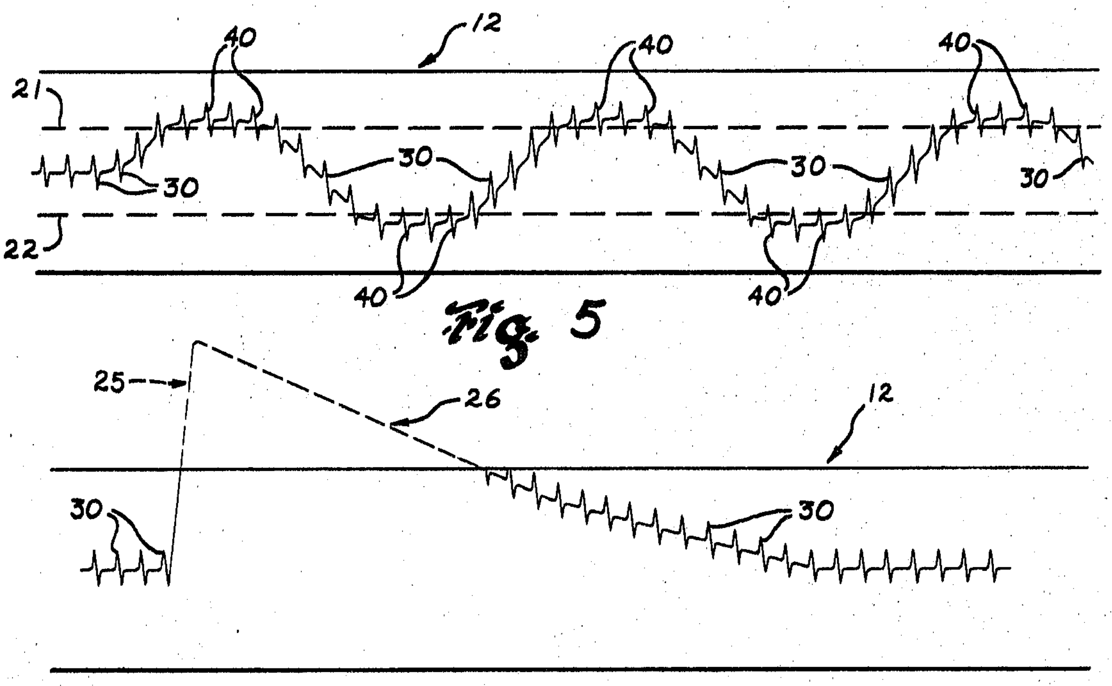
FIG. 5 depicts a typical trace produced after the same input signal is processed by an amplifier constructed in accordance with the principles of my invention.
FIG. 6 depicts a typical trace which is produced in prior art circuits in response to a sudden change in the DC level on which the ECG signals are superimposed.

FIG. 5 depicts the type of trace achieved with the use of an amplifier constructed in accordance with the principles of my invention. The amplifier circuitry includes two threshold detectors for determining when the output signal exceeds predetermined limits of either polarity. These two limits correspond to pen deflections at lines 21, 22. As long as the total output signal does not exceed either threshold value, the trace is maintained within the bounds of lines 21, 22. This is shown on the left side of the drawing. Suppose that suddenly the ECG signal is interfered with ECG high level, low frequency noise. Initially, during the first positive half-cycle of the noise signal, the output signal increases in a first direction to deflect the pen toward line 21. Until the output voltage reaches the respective threshold level at which point the pen is along line 21, the amplifier input time constant has a high value and the ECG waveforms 30 which are recorded on the trace faithfully follow the true ECG waveforms. As soon as the output voltage reaches the threshold level, the input time constant is switched to a low value. This has the effect of greatly attenuating the low frequency noise. The signal is decreased to such an extent that the upper part of each positive half-cycle does not overshoot the edge of the paper. Thus, the ECG waveforms can still be seen superimposed on the noise. However, above line 21 each ECG waveform has the shape of waveform 40 in FIG. 1A, since the decreased amplifier time constant does slightly affect the ECG waveform.

As the output voltage decreases below the threshold level corresponding to line 21 in FIG. 5, during the second half of the first half-cycle of the noise signal, the input time constant is switched back to the high value. The waveforms which are recorded between lines 21 and 22 thus faithfully represent the ECG waveforms.

During the second half-cycle of the noise signal, the output voltage exceeds the threshold level corresponding to line 22. At this time, the shorter input time constant is switched back into the circuit once again for attenuating the noise signal. The ECG waveforms which are recorded between line 22 and the lower edge of the paper are of the type shown by the numeral 40 in FIG. 1A. As soon as the total output voltage becomes less than the threshold value corresponding to line 22, the higher input time constant is switched back into the circuit and the ECG waveforms which are recorded correspond to waveform 30 of FIG. 1A.

The trace continues in this fashion with all of the ECG waveforms between lines 21 and 22 being recorded with no attenuation of their low frequency components, while all of the ECG waveforms recorded without the bounds of lines 21, 22 are recorded with the loss of low frequency information. Nevertheless, the presence of waveforms 40 on the trace are far better than nothing at all. They still contain a considerable amount of information which can be used to advantage by the cardiologist.

FIG. 6 depicts a typical prior art trace which is produced when the DC component of the ECG signal suddenly increases, due to patient movement or otherwise. Initially the pips are superimposed on the baseline at the center of the paper strip. With a sudden increase in the quiescent voltage level, the output voltage increases to a point far above that which corresponds to the maximum possible trace at the edge of paper 12. The increased signal is shown by line 25. The line is dotted outside the paper strip inasmuch as there is no actual trace corresponding to levels which exceed that which deflects the pen to the edge of the paper. Assuming that the change in input is a step function, the output voltage decays exponentially in accordance with the input time constant. This decay is shown by line 26 which, like line 25, is shown dotted outside the limits of the paper. As soon as the decaying output voltage falls within the maximum voltage level corresponding to the edge of the paper, the ECG signal is recorded once again. The ECG waveforms are now superimposed on the exponentially decaying baseline 26. After the input capacitor has fully charged to a voltage equal to the input step, the new DC level has no effect on the circuit operation. Once again, the ECG waveforms are superimposed on the center baseline.

The problem with the prior art systems of this type is that with a long input time constant it takes a considerable time period before the output voltage is back within the maximum usable limits. Nor is it possible to eliminate the input capacitor. Somewhere in the amplifier a capacitor should be provided to AC-couple the signal to a succeeding stage. Without a capacitor to provide this AC coupling, in most cases it would be impossible to obtain a trace in the first place. The DC level at the electrodes changes constantly and to a degree which is significant with respect to the total ECG signal swing. Without a capacitor for preventing permanent changes in the output voltage in accordance with changes in the DC level at the input, the output voltage would very often exceed the maximum usable limits. Somewhere in the circuit a capacitor is necessarily connected to another element which has some effective input impedance. This effective impedance, together with the capacitor, constitutes a time constant with which the present invention is concerned.

Figure 7:
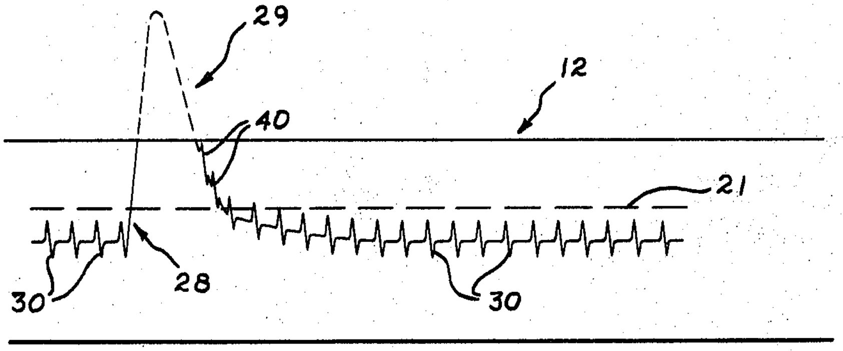
FIG. 7 depicts the trace which is produced for the same input condition as in FIG. 6 with the use of an amplifier constructed in accordance with the principles of my invention.

FIG. 7 illustrates the effect of switching the time constant in accordance with the principles of my invention on the occurrence of a change of the DC level at the input. Once again, the increased DC level causes the output voltage to exceed the maximum usable value as shown by line 28. But as soon as the output voltage exceeds the threshold level corresponding to line 21, the input time constant is shortened. The capacitor now charges faster as a result of the shortened time constant. Curve 29 shows the exponential decay on which the ECG waveforms are superimposed. The decay is much faster than that in FIG. 6. As soon as the output voltage is less than the maximum value corresponding to the upper edge of the paper, the ECG signal can be recorded on the trace. Since the time constant is still shortened, the ECG waveforms are slightly distorted, and two such pips 40 are shown in FIG. 7 between the upper edge of the paper and line 21. As soon as the output voltage is below the threshold value corresponding to line 21, the higher-valued time constant is switched back into the circuit. The exponential decay is now slower. The ECG waveforms which are recorded are identified by the numeral 30 since they are not distorted. It is obvious from an examination of FIGS. 6 and 7 that the use of my invention greatly decreases the time period during which ECG waveforms are not recorded following an abrupt change of the DC level at the input.

Figure 8:
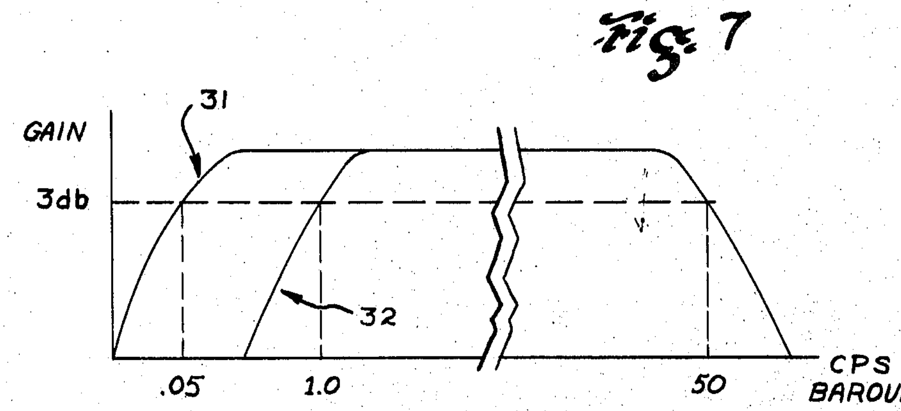
FIG. 8 depicts a typical gain characteristic of an amplifier constructed in accordance with the principles of my invention to reduce the deleterious effects of low frequency noise.

FIG. 8 simply depicts the gain versus frequency characteristic of an amplifier which includes the adjustable input time constant. Assuming that the amplifier has a constant gain for all frequencies above a few cycles per second and a decreasing gain for higher frequencies around 50 cycles per second, it is apparent that the total gain of the stage is determined by the way in which the high-pass filter at the input affects the amplification of each signal frequency. The total gain characteristic shown by curve 31 is that which results during normal operation when the input time constant is long. The upper 3-db point is at 50 cycles per second and the lower 3-db point is at .05 cycles per second. The former is high enough such that none of the high frequency components of interest in the ECG waveforms are attenuated. The latter 3-db point is at a frequency low enough such that none of the low frequency components of interest in the ECG waveforms are attenuated.

Curve 32 shows the effect on the total amplifier gain characteristic when the input time constant is shortened following the detection of high level, low frequency noise. In this case, while the 3-db point at 50 cycles per second remains unchanged, the low frequency 3-db point is at 1.0 cycles per second. Signals with frequencies below 1 cycle per second, such as a typical noise signal, are attenuated sufficiently such that the output voltage does not exceed the maximum usable level. While the low frequency components in the ECG signal are also attenuated, because the high frequency components are in no way affected the output trace still contains a considerable amount of useful information.

Figure 9:
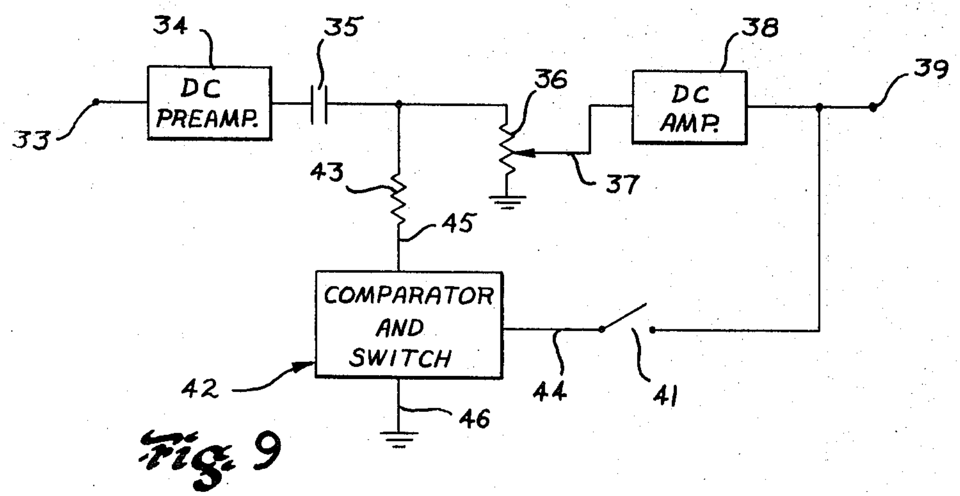
FIG. 9 depicts schematically an illustrative embodiment of my invention which reduces the deleterious effects of low frequency noise.

FIG. 9 depicts schematically a first illustrative embodiment of my invention. The input signal is applied between terminal 33 and ground. DC preamplifier 34 has a gain characteristic which is constant all the way down to DC and a high frequency 3-db cutoff above 50 cycles per second. The amplified signal is transmitted through capacitor 35 to resistor 36. If switch 41 is open (in the case where an adjustable time constant may not be desired) or if the switch is closed but the output voltage at terminal 39 does not exceed the two threshold limits, comparator and switch 42 maintains an open circuit between conductor 46 and conductor 45. Consequently, resistor 43 does not load the input of DC amplifier 38, and DC preamplifier 34 is simply connected across capacitor 35 and potentiometer 36. The setting of center tap 37 controls the input level to DC amplifier 38. This amplifier, like preamplifier 34, has a constant gain characteristic from DC up to the higher frequencies, and has a high frequency 3-db cutoff above 50 cycles per second.

With resistor 43 not connected in the circuit, the input time constant for amplifier 38 is determined solely by capacitor 35 and resistor 36 (in parallel with the amplifier input impedance). As with any RC network of this type, low frequency signals are attenuated with respect to high frequency signals because for low frequency signals the impedance of the capacitor is greater. Capacitor 35 and resistor 36 have values such that the total gain of the circuit from terminal 33 to terminal 39 has the characteristic shown by curve 31 of FIG. 8.

Comparator and switch 42 operate to close the circuit between conductors 45 and 46 (assuming that switch 41 is closed) if the output voltage at terminal 39 exceeds a maximum limit in either direction. The operation of comparator and switch 42 is very fast. As soon as the output voltage exceeds either limit, resistor 43 is inserted in the circuit. As soon as the output voltage comes back within the bounds defined by the two outer limits, resistor 43 is removed from the circuit. With the resistor in the circuit the time constant is shortened because the effective resistance of resistor 43 in parallel with potentiometer 36 is less than the resistance of potentiometer 36 alone. Resistor 43 has a value such that when it is included in the circuit the gain characteristic of the entire circuit from terminal 33 to 39 is that shown by curve 32 in FIG. 8. The actual selection of parameter values for capacitor 35, resistor 43 and potentiometer 36 will be apparent to those skilled in the art. Actually, if an adjustable input to amplifier 38 is not required in a particular application, there is no need to utilize a potentiometer. In fact, there may be no reason to insert any impedance between capacitor 35 and the input of amplifier 38 inasmuch as any DC amplifier has an effective input impedance. If this input impedance is such that there is available a capacitor 35 for giving the gain characteristic shown by curve 31 in FIG. 8, there is no need to provide a separate element 36 in the circuit.

Figure 10:
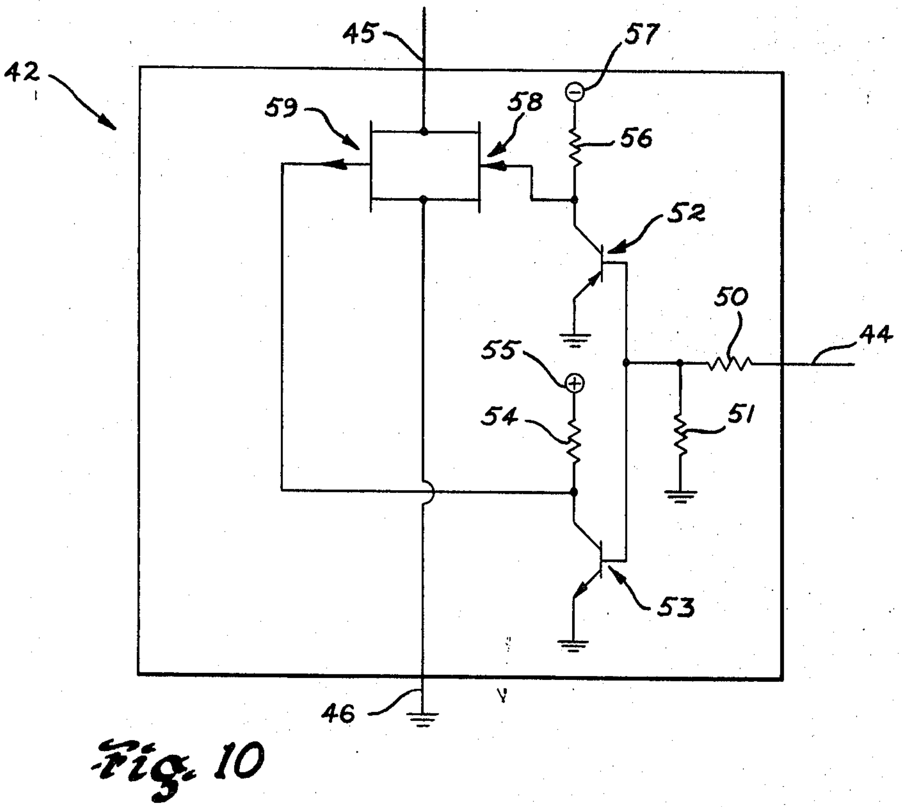
FIG. 10 depicts in greater detail comparator and switch 42 of FIG. 9.

FIG. 10 shows in detail a particular circuit which may be used as the comparator and switch 42 in FIG. 9. If switch 41 is open, or if the output signal on conductor 44 is within the maximum limits, both transistors 52 and 53 are nonconducting. The collector of transistor 52 which is coupled directly to FET switch 58 biases the switch to nonconduction. Similarly, the collector of transistor 53, which is at the positive potential of source 55 and is connected to FET switch 59 of an opposite type, maintains this switch nonconductive. Conductor 45 is not connected to conductor 46 and resistor 43 in FIG. 9 is effectively out of the circuit.

As long as the output voltage is within the maximum usable values, the voltage at the junction of resistors 50, 51 is between the limits of +.5 volt and −.5 volt. The voltage is never sufficiently positive to forward bias NPN transistor 53 nor is it sufficiently negative to forward bias PNP transistor 52. If the output voltage, however, exceeds the level corresponding to line 21 on FIGS. 5 and 7, the base-emitter junction of transistor 53 is forward biased. The transistor conducts and current flows from positive source 55 through resistor 54 and the transistor to ground. The collector of the transistor drops in potential and triggers FET switch 59. Conductor 45 is short circuited through this switch to conductor 46, and resistor 43 is inserted in the circuit. As soon as the output voltage decreases below the level corresponding to line 21 on the trace, the voltage at the junction of resistors 50, 51 drops below +.5 volt, transistor 53 turns off, and FET switch 59 stops conducting to effectively remove resistor 43 from the circuit.

Similarly, if the output voltage goes sufficiently negative, beyond that level corresponding to line 22 on the trace, the voltage at the junction of resistors 50, 51 goes negative beyond −.5 volt. Transistor 52 conducts and current flows from ground through the transistor and resistor 56 to negative source 57. The collector of the transistor is less negative in potential and FET switch 58 is turned on. Conductor 45 is connected through the switch to conductor 46 to insert resistor 43 into the circuit. As soon as the output voltage returns to within the maximum bounds, transistor 52 and FET switch 58 turn off and resistor 43 is removed from the circuit. Resistors 50 and 51 and transistors 52 and 53 are arranged to function as a bipolarity threshold detector.

Figure 11:
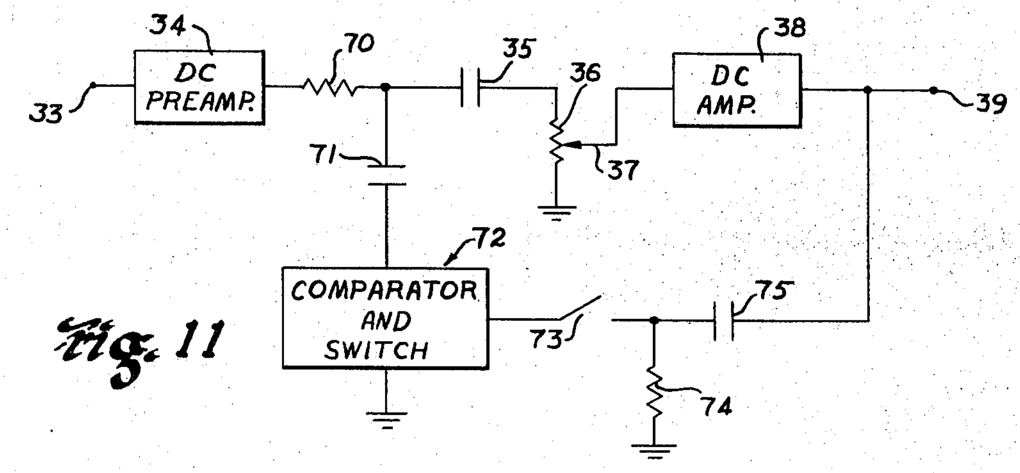
FIG. 11 depicts schematically an illustrative embodiment of my invention which reduces the deleterious effects of high frequency noise.

FIG. 11 discloses an embodiment of the invention which attenuates high frequency components in the overall signal in the presence of high level, high frequency noise. Elements 33, 34, 35, 36, 37, 38 and 39 are the same as the same-numbered elements in the circuit of FIG. 9. While the input of amplifier 38 in FIG. 9 can be loaded by an additional resistor 43, in the circuit of FIG. 11 the input of the amplifier can be loaded by an additional capacitor 71. Ordinarily, the capacitor is not connected through comparator and switch 72 to ground and is effectively out of the circuit. However, if switch 73 is closed and the high frequency content of the total output signal exceeds a predetermined threshold, the capacitor is connected through comparator and switch 72 to ground.

Resistor 70 and capacitor 71 comprise a low-pass filter as opposed to the high-pass filter (capacitor 35 and resistor 43) in FIG. 9. The low-pass filter of FIG. 11 attenuates higher frequencies because for these frequencies there is a greater voltage drop across resistor 70 relative to the drop across capacitor 71.

Figure 13:
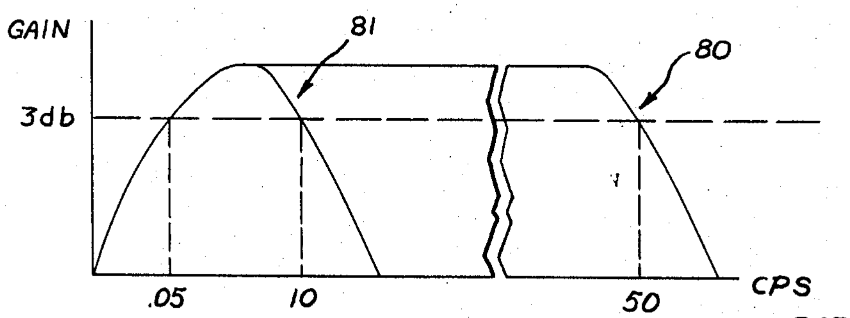
FIG. 13 depicts a typical gain characteristic of an amplifier constructed in accordance with the principles of my invention to reduce the deleterious effects of high frequency noise.

FIG. 13 depicts the gain versus frequency characteristic of the system of FIG. 11. If no noise is present, the overall gain is of the form depicted by curve 80—a lower 3-db cutoff of 50 cycles per second. In the presence of high level, high frequency noise, however, the gain characteristic is that shown by curve 81. The upper 3-db point is lowered to 10 cycles per second. The high frequencies in the ECG waveform are attenuated. Most of the desired information is contained in these high frequencies and quite a bit of information may be absent in the resulting trace. Nevertheless, any signal is better than none at all.

It should be noted that the circuit of FIG. 11 includes a differentiator (high-pass filter) comprising capacitor 75 and resistor 74. The output signal is not fed directly through switch 73 to comparator and switch 72. Capacitor 71 should be connected to ground only if the output exhibits large magnitude, high frequency noise. The differentiator attenuates low frequency signals, that is, for any low frequency signal at the output of amplifier 38 the voltage across resistor 74 is very small. Consequently, the low frequencies in the output signal do not control the connection of capacitor 71 through element 72 to ground. It is only the high frequencies which are effectively shorted through capacitor 75 to develop a high voltage across resistor 74 that control the connection of capacitor 71 in the circuit.

In the circuit of FIG. 11, capacitor 71 is connected to ground only during the peak of each half-cycle of a high frequency noise signal. A typical high frequency noise signal is a simple spike, which can be generated, for example, by the operation of a pacemaker. To avoid saturation of the amplifiers in the monitoring equipment, the spikes should be clipped. In the circuit of FIG. 11, as soon as the spike exceeds the threshold level, capacitor 71 is connected through comparator and switch 72 to ground. The capacitor effectively limits or clips the spike. (The voltage across a capacitor cannot change instantaneously. As soon as capacitor 71 is effectively inserted into the circuit, the voltage across it cannot increase instantaneously, or appreciably before the spike terminates, and the spike is effectively clipped as desired.)

The circuit of FIG. 11 is very similar in principle to that of FIG. 9. For example, comparator and switch 72 can be the same as comparator and switch 42. The basic distinction is that the circuit of FIG. 11 results in the loading of the input of amplifier 38 by a capacitor, rather than a resistor. The circuit of FIG. 11 further includes a differentiator so that comparator and switch 72 responds only to high frequency noise.

A similar circuit is not provided in the system of FIG. 9 to insure that only the low frequency components cause the insertion of resistor 43 in the circuit. This could be accomplished with the provision of an integrator circuit between output terminal 39 and switch 41. For example, if capacitor 75 and resistor 74 are interchanged and inserted between output terminal 39 and switch 41, the high frequency components of the output signal would not be extended to the comparator and switch. Such a circuit is not used in the system of FIG. 9 because at the same time that it would filter out the high frequencies it would introduce an appreciable phase shift in the low frequencies. Resistor 43 would be inserted in the circuit some time after the threshold was exceeded and it would be removed from the circuit some time after it is no longer needed. High frequency noise thus can trigger comparator and switch 42 in FIG. 9. Resistor 43 is rapidly switched in and out of the circuit, but at worst this simply results in a high frequency ripple in the output.

Figure 12:
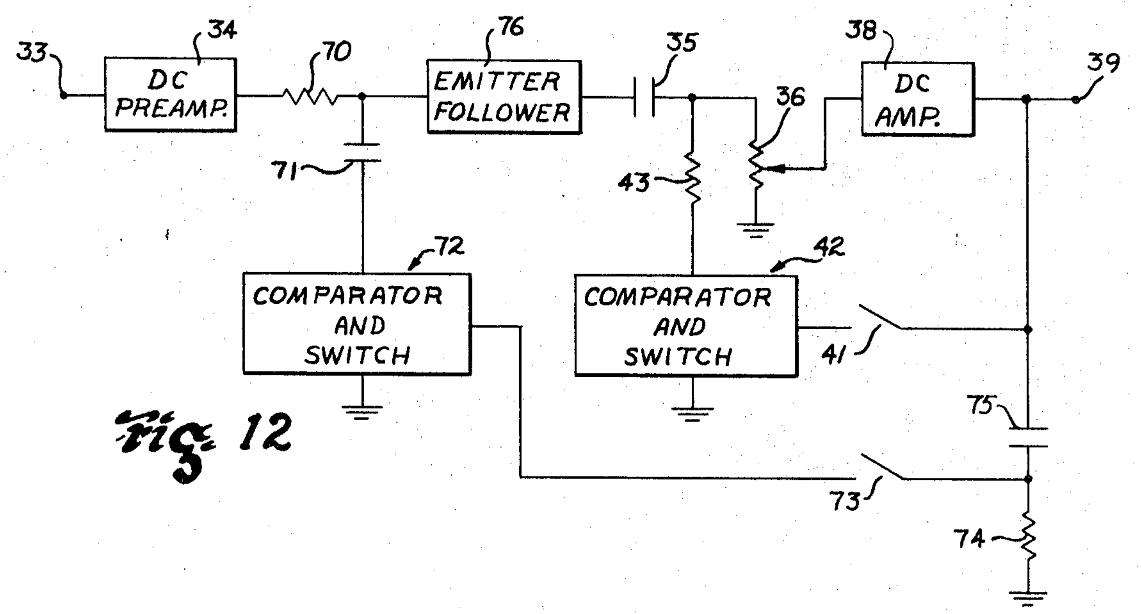
FIG. 12 depicts schematically an illustrative embodiment of my invention which reduces the deleterious effects of both low and high frequency noise.

The circuit of FIG. 12 is a combination of the circuits of FIGS. 9 and 11. The only additional element is emitter follower 76. The low-pass filter including resistor 70 and capacitor 71 effectively increases the output impedance of preamplifier 34 as far as successive stages are concerned. For proper impedance matching an emitter follower can be used. The emitter follower has a low output impedance, similar to that of preamplifier 34, so that effectively capacitor 35 is fed from a low impedance source.

Although the invention has been described with reference to particular embodiments, it is to be understood that these embodiments are merely illustrative of the application of the principles of the invention. While the amplifier of the invention has unique application in electrocardiographic systems, it can be used advantageously in oscillographic and many other types of systems. Thus it is to be understood that numerous modifications may be made in the illustrative embodiments of the invention and other arrangements may be devised without departing from the spirit and scope of the invention.

I claim:

1. An electrocardiographic amplifier comprising amplifying means for amplifying an electrocardiographic signal, said amplifying means normally having a constant gain for all frequency components characteristic of said signal, detecting means for detecting the presence and absence of low frequency noise above a predetermined magnitude, and gain lowering and restoring means responsive instantaneously to said detecting means for lowering and restoring a low frequency portion of said gain, said portion corresponding substantially in frequency range to that of said noise, thereby controlling said noise.

2. An electrocardiographic amplifier in accordance with claim 1 wherein said detecting means is a bipolarity threshold detector responsive to the magnitude of an output signal of said amplifying means exceeding a predetermined value.

3. An electrocardiographic amplifier in accordance with claim 1 further including a high-pass filter having a first resistor and a capacitor therein through which said signal is transmitted and wherein said gain lowering and restoring means includes placing means for placing and removing an additional resistor in parallel with said first resistor in said high-pass filter substantially simultaneously with the detection of the presence and absence of said noise above said predetermined magnitude.

4. An electrocardiographic amplifier in accordance with claim 3 wherein said amplifying means is a DC amplifier.

5. An electrocardiographic amplifier comprising amplifying means for amplifying an electrocardiographic signal, said amplifying means having output means and normally having a constant gain for all frequency components characteristic of said signal, detecting means for detecting from said output means the presence and absence of high frequency noise above a predetermined magnitude, and gain lowering and restoring means responsive instantaneously to said detecting means for lowering and restoring a high frequency portion of said gain, said portion corresponding substantially in frequency range to that of said noise, thereby controlling said noise.

6. An electrocardiographic amplifier in accordance with claim 5 wherein said detecting means is a bipolarity threshold detector responsive to the high frequencies in an output signal of said amplifying means exceeding a predetermined threshold level.

7. An electrocardiographic amplifier in accordance with claim 5 wherein said gain lowering and restoring means includes inserting means for inserting and removing a low-pass filter in the transmission path of said signal simultaneously with the detection of the presence and absence of said noise above said predetermined magnitude.

8. An electrocardiographic amplifier in accordance with claim 6 wherein said amplifying means is a DC amplifier.

9. An electrocardiographic amplifier in accordance with claim 5 wherein said detecting means includes means for differentiating said signal and means for comparing the differential signal with a threshold level.

10. An amplifier comprising amplifying means for amplifying an input signal, said amplifying means having output means and normally having a constant gain for all frequency components characteristic of said signal, determining means for determining from said output means whether an output of said amplifier means exceeds a predetermined value, gain lowering means responsive simultaneously to said determining means for lowering the gain of said amplifying means for selected frequency components characteristic of said signal, a high-pass filter having a first resistor and a capacitor therein through which said input signal is transmitted, and wherein said gain lowering means includes means for placing an additional resistor in parallel with said first resistor in said high-pass filter simultaneously with the determination of the presence of said signal above said predetermined value.

11. An amplifier in accordance with claim 10 wherein said amplifying means is a DC amplifier and said selected frequency components are at the low end of the frequency spectrum of said input signal.

12. An amplifier in accordance with claim 10 wherein said determining means includes means for deemphasizing the low frequency components in the output of said amplifying means relative to the high frequency components therein.

13. An amplifier in accordance with claim 10 wherein said gain lowering means includes means for inserting a low-pass filter in the transmission path of said input signal.

14. An amplifier in accordance with claim 12 wherein said gain lowering means includes means for inserting a low-pass filter in the transmission path of said input signal.

15. An amplifier in accordance with claim 12 wherein said amplifying means is a DC amplifier and said selected frequency components are at the high end of the frequency spectrum of said input signal.

16. An amplifier comprising amplifying means for amplifying an input signal, said amplifying means having output means and normally having a first gain characteristic, detecting means for detecting from said output means the presence of noise interfering with said input signal, and adjusting means responsive instantaneously to said detecting means for adjusting said amplifying means to have a second gain characteristic said second characteristic providing a reduction in interference between said noise and signal, a high-pass filter having a first resistor and a capacitor therein through which said input signal is transmitted, and wherein said adjusting means includes means for placing an additional resistor in parallel with said first resistor in said high-pass filter.

17. An amplifier in accordance with claim 16 wherein said detecting means is a threshold detector responsive to the magnitude of an output signal of said amplifying means exceeding a predetermined value.

18. An amplifier in accordance with claim 16 further including means for limiting the response of said detecting means to the high frequency components in said input signal relative to the low frequency components therein, and wherein said second gain characteristic has an upper 3-db point which is lower in frequency than the upper 3-db point of said first gain characteristic.